Patented Sept. 29, 1942

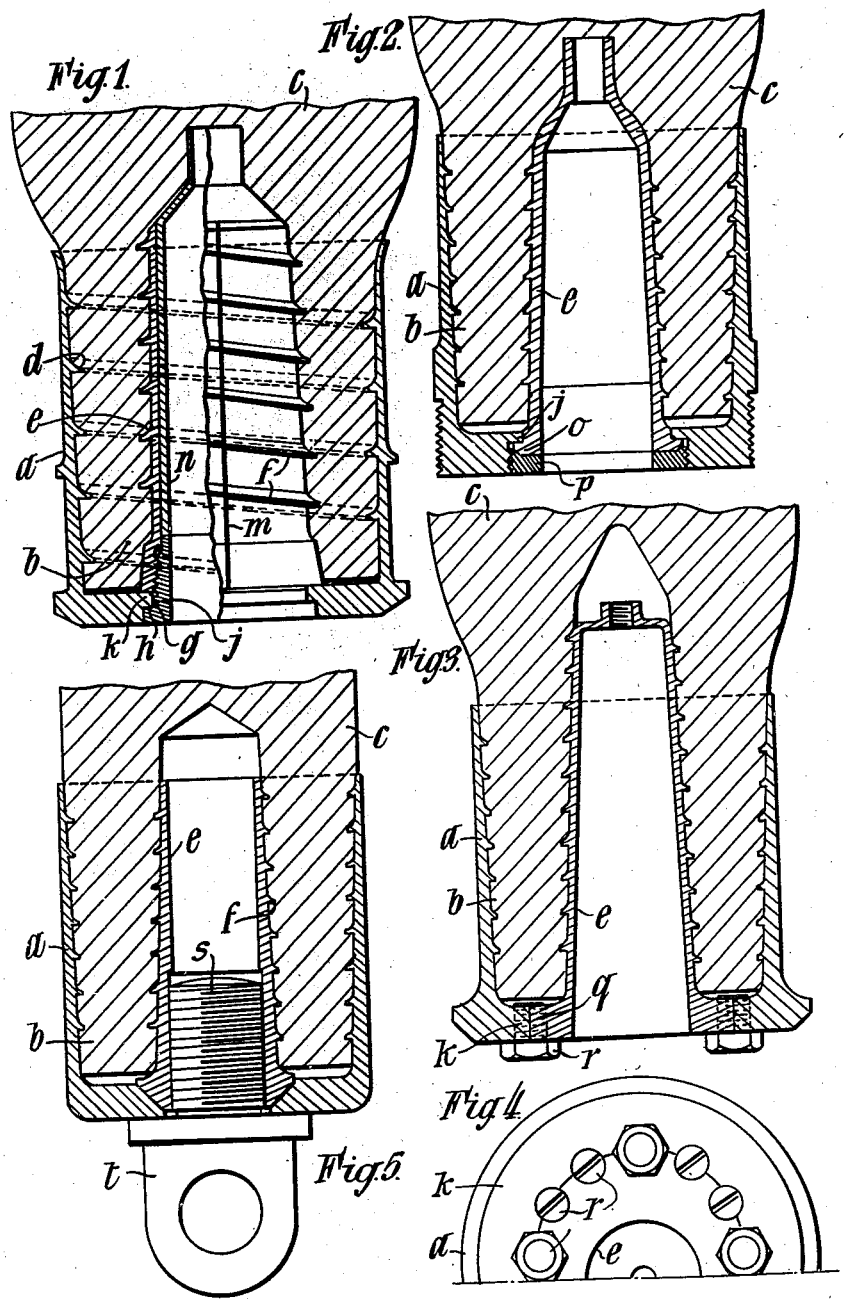

2,297,142

UNITED STATES PATENT OFFICE 2,297,142

SOCKET AND THE METHOD OF ITS ATTACHMENT TO THE ROOT ENDS OF AIRSCREW BLADES, SPARS, STRUTS, OR THE LIKE

Henry Victor German, Howgate, Bembridge, Isle of Wight, England, assignor to Hordern-Richmond Aircraft, Limited, Chesham, England, a company of Great Britain and Northern Ireland Application March 11, 1940, Serial No. 323,414
In Great Britain March 11, 1939

3 Claims. (Cl. 29—156.8)

This invention relates to the method of securely attaching a socket to the root or shank end of an airscrew blade or to the end of a spar, strut or the like.

It is known to secure a metal socket on the root end of a non-metallic airscrew blade by providing a screw thread cut on the root end. It is also known to employ other constructions whereby the socket and root or shank end are interengaged so that a direct pull tending to separate the socket and root places certain portions of the outer part of the root or shank in shear. In such constructions the resistance to separation is mostly due to the resistance to shear but whilst providing quite a good connection they suffer from certain disadvantages. In the first place, if over stressed there is a tendency for the non-metallic material of which the root end or shank is formed to become compressed although not sheared, so that the connection becomes loose. To overcome this, the length of the connection or the depth of the interengagement could be increased, but in practice this is not always desirable.

The object of the present invention is to provide an improved method of connecting a socket to a root or shank end of a non-metallic airscrew or to the end of a non-metallic spar or the like wherein the area of interlock and the material subject to shearing forces is increased without increasing the length of the socket or the depth of the interengagement.

According to the invention the method of securing a socket to the root or shank end of a non-metallic airscrew or the shank end of a non-metallic spar or the like consists in forming the socket in two parts, namely, an outer sleeve and an inner plug hollowing the said end, securing said sleeve on the outside of said end, securing said plug within said hollow end and locking the sleeve and plug together so that the sleeve and plug jointly resist removal.

Where the inter-engagement with the root or shank end is formed by a screw thread in the sleeve and on the plug, the threads on the respective parts may have the opposite sense, so that any tendency for the root or shank end to turn on the socket will be effectively prevented when the plug and sleeve are rigidly secured together. The plug may be hollow and carry journal bearings.

The means for securing together the plug and sleeve may be such as to avoid producing any internal forces in the assembly tending to urge the plug and sleeve axially with respect to one another.

A variety of methods may be used for the assembly of the parts constituting the socket. Several will now be described but it is to be understood that variations in design and procedure of application may be made to suit the physical peculiarities of the (for example) airscrew blade root material.

Referring to the accompanying drawing:

Fig. 1 is a longitudinal section of one form of socket made according to the present invention shown mounted on the root end of a wood airscrew blade.

Fig. 2 is a longitudinal section of a modified form of socket wherein the sleeve and plug are secured together by means similar to that shown in Fig. 1.

Fig. 3 is a longitudinal section of a further modified form of socket showing a different arrangement for securing together the sleeve and plug.

Fig. 4 is an underneath plan of the socket shown in Fig. 3.

Fig. 5 is a longitudinal section of a modified form of socket shown mounted on the shank end of a wood spar.

Where possible the same reference letters have been used for the same parts. In all the figures $a$ is the outer sleeve, $b$ the root or shank end on which the socket is secured, $c$ the airscrew blade or spar, $d$ the internal screw thread on the sleeve $a$ and $e$ the plug having the external screw thread $f$.

In the form shown in Fig. 1 the socket comprises an outer sleeve $a$ of high tensile steel mounted on the root end $b$ of an airscrew blade $c$ the inner face of the sleeve $a$ having a right hand screw thread $d$ of buttress type for engaging the root end $b$. The root end $b$ is bored axially to receive a hollow plug $e$ also of high tensile steel having an external left hand screw thread $f$ of the buttress type and arranged concentrically relatively to the outer sleeve $a$. The plug $e$ is connected to the outer sleeve $a$ by means of a screw threaded bush $g$ which engages a thread on the inner face of the hollow plug $e$ and is provided with a flange $h$ which engages a shoulder $j$ on the outer sleeve $a$. This latter shoulder is formed as on an inturned flange $k$ forming the base of the socket. By tightening the bush $g$ against the shoulder $j$ the base end of the inner hollow plug $e$ is pressed against the said shoulder $j$ and both hollow plug $e$ and outer sleeve $a$ are held rigidly together. When fully home the brush $g$ is keyed or pinned to the inturned flange $k$.

The airscrew blade $c$ is formed by wood veneers and a thermo-plastic substance is used to bond and/or impregnate the wood. The plug $e$ is split axially at $m$, and an expanding member $n$ forced into the hollow plug $e$ exerting a radial pressure, which will be transmitted through the root material to the outer sleeve thereby increasing intimacy of contact.

The socket is assembled on the root end as follows. The plug $e$ is first inserted cold. The outer sleeve is heated and screwed on hot so that on cooling it will contract and further increase the security of the whole. The expanding member $n$ is then forced into the hollow plug $e$ and the threaded bush $g$ screwed home and locked in position. It will be seen that by this method the root or shank end is firmly compressed between the sleeve $a$ and the plug $e$ and that by this simple method a much greater area is placed under shear without increasing the length of the socket or the depth of the inter-engagement. The invention enables a smaller socket to be used for a given load.

If the root is coated with a thermo-plastic or chemically setting substance before the inner plug $e$ and the outer sleeve $a$ are placed in position a more intimate contact over the whole of the two surfaces may be ensured and all voids or interstices filled.

In the form shown in Fig. 2, a slightly different construction is employed for securing together the sleeve $a$ and plug $e$. In this form the sleeve $a$ has to be screwed into position first. The plug $e$ is then inserted and screwed in until the flange $o$ abuts on the shoulder $j$ on the sleeve $a$. The end of the sleeve $a$ is threaded internally to receive a locking ring $p$ which when in position holds the plug $e$ pressed firmly into contact with the sleeve $a$.

In the form shown in Figs. 3 and 4 the construction is further modified. The inturned flange $k$ of the sleeve $a$ extends to halfway between the sleeve $a$ and plug $e$ and the latter is formed with an out-turned flange $q$ which is a close fit within the flange $k$. The holes for the reception of grub screws $r$ at the junction of the two flanges are not drilled until the sleeve $a$ and plug $e$ have been screwed home on the root end $b$ into their final positions. If the flanges $k$ and $q$ are not quite flush this should be rectified by grinding. A drilling jig can then be placed in position and the holes drilled and subsequently tapped to receive the grub screws $r$ some or all of which may have heads as shown for use in securing a cover plate or other fitting (not shown) or may have taper threads and no heads so that they lock themselves and leave no slack in the threads. If a cover plate is used a packing washer may be employed to seal the end against ingress of oil. By this construction and method of locking together the sleeve $a$ and plug $e$ it can be ensured that the threads of each are brought into equal abutment with the root end $b$ so that the load is imparted simultaneously to both. The construction also provides that in screwing home either the sleeve or plug the degree of thread abutment pressure of the one shall not be altered by the other.

The construction also avoids creating any internal stresses in the assembly. The joint and screw holes may be welded or caulked after assembly to render the base oil-tight. In the form shown in Fig. 5 a conical joint is provided between the sleeve $a$ and plug $e$ and the two are held together by a central bolt or plug $s$ the head $t$ of which is conveniently formed with an eye for attachment purposes.

The inner plug $e$ may be arranged as a spigot bearing to increase resistance of the assembly movement, for example, as is required for some variable pitch airscrew blades.

Since the inner plug by this arrangement takes a considerable proportion of the centrifugal or tensile load high tensile steel is the most suitable material to use for its construction. Such steel however is not suitable for a journal bearing and bushing which bearing material would occupy valuable space and necessitate a reduction in the size of the spigot or an increase in the size of the plug. To overcome this difficulty and to avoid the complication of providing adequate lubrication the inside of the plug may be impregnated, amalgamated or coated with graphite or other dry lubricator or may be electro-plated, with suitable bearing material which may in turn be impregnated with the graphite or other dry lubricant.

In normal practice in which the threading of outer sleeve to root is the means of attachment, this threading is either right or left handed according to the direction of rotation of the engine.

The present invention provides a positive interlocking between inner plug and outer sleeve and obviates the necessity of providing differently threaded roots to suit engines of opposite rotational direction.

The screw threads in the outer sleeve and on the inner plug may be of the "buttressed" type, or annular projections may be used instead of screw threads. In the latter case, the sleeve and/or plug may be split axially or divided into segments and secured in position, in the case of the outer member by a surrounding sleeve and in the case of the inner member, by an expander member, as previously mentioned.

The various forms of sleeve and plug shown are all tapered but they may be parallel-sided and/or may be splined instead of being screw-threaded.

An alternative method for securing the inner plug after insertion may be to expand it by normal mechanical means such as by the use of rollers or by using hydraulic pressure. The hollow inner plug may be utilised as a means by which suitable cement or other material in fluid state can be forced through holes in the plug to permeate any interstices which may be present between metal plug and root end requiring fixing. Similarly, the same treatment if required can be given to the inner surfaces of the outer sleeve.

What I claim and desire to secure by Letters Patent is:

1. The method of securing a socket to the root end of a non-metallic member, consisting in forming the socket in two parts, namely, an outer sleeve, and an inner plug, hollowing out the said root end and providing coacting screw threads on said socket, plug and root end whereby said socket and plug are secured to said root end, said socket and plug having contiguous surfaces and providing screw threaded holes formed partly in the socket and partly in the plug to receive a threaded locking screw whereby said plug and sleeve are locked against axial movement relative to one another without stressing the material of which the root end is composed and jointly resist removal therefrom.

2. The method of securing a socket to a root end consisting in forming the socket in two parts, namely, an outer sleeve and an inner plug, hollowing out the said root end and providing coacting screw threads on said socket, plug and root end whereby said socket and plug are secured to said root end, forming said socket with an inwardly directed flange having a surface contiguous to the outside surface of said plug, drilling and tapping holes parallel to the axis of said sleeve and plug, said holes being formed partly in said plug and partly in said flange and inserting locking screws in said holes whereby said plug and sleeve are locked against axial movement relative to one another without stressing the material of which the root end is composed and jointly resist removal therefrom.

3. A socket for securing to a tubular root end, comprising a sleeve adapted to be secured to the outside of said root end, a plug adapted to be secured within said root end, confronting flanges on said sleeve and plug, threaded holes formed in said confronting flanges at the junction thereof, and locking means comprising screws for engaging said threaded holes to secure said sleeve and plug together against relative axial movement.

HENRY VICTOR GERMAN.